United States Patent [19]

Wolf et al.

[11] Patent Number: 5,596,364

[45] Date of Patent: Jan. 21, 1997

[54] PERCEPTION-BASED AUDIO VISUAL SYNCHRONIZATION MEASUREMENT SYSTEM

[75] Inventors: Stephen Wolf, Nederland; Coleen T. Jones, Louisville; Arthur A. Webster, III, Longmont; Stephen Voran; Margaret H. Pinson, both of Boulder, all of Colo.; Robert F. Kubichek, Laramie, Wyo.

[73] Assignee: The United States of America as represented by the Secretary of Commerce, Washington, D.C.

[21] Appl. No.: 413,362

[22] Filed: Mar. 30, 1995

Related U.S. Application Data

[60] Division of Ser. No. 153,561, Oct. 6, 1993, abandoned, which is a continuation-in-part of Ser. No. 6,000, Jan. 19, 1993, Pat. No. 5,446,492.

[51] Int. Cl.⁶ .................................................. H04N 17/00
[52] U.S. Cl. ...................................... 348/192; 348/180
[58] Field of Search .................................. 348/192, 193, 348/194, 189, 180, 15, 16, 17, 18, 19; 358/10, 139; 381/71, 94; 455/67.1, 67.6; H04N 17/00, 17/02, 17/04

[56] References Cited

U.S. PATENT DOCUMENTS

| | | |
|---|---|---|
| 3,596,182 | 7/1971 | Menard . |
| 3,842,247 | 10/1974 | Anderson . |
| 3,988,678 | 10/1976 | Hodge . |
| 4,215,367 | 7/1980 | Schaffer et al. ................... 348/192 |
| 4,220,972 | 9/1980 | Geokezas et al. .................. 358/166 |
| 4,276,564 | 6/1981 | Watson et al. ..................... 348/192 |
| 4,623,837 | 11/1986 | Efron et al. ......................... 324/77 |
| 4,628,360 | 12/1986 | Mook et al. ........................ 348/193 |
| 4,814,858 | 3/1989 | Mochizuki et al. ................. 348/191 |
| 4,881,270 | 11/1989 | Knecht et al. ...................... 382/17 |
| 4,935,814 | 6/1990 | Omoto et al. ...................... 348/193 |
| 4,967,273 | 10/1990 | Greenberg ......................... 358/142 |
| 4,970,653 | 11/1990 | Kenue ................................ 364/461 |
| 5,025,308 | 6/1991 | Lee ..................................... 348/181 |
| 5,031,620 | 7/1991 | Oe ....................................... 128/653 |
| 5,033,015 | 7/1991 | Zwirn ................................. 364/579 |
| 5,056,524 | 10/1991 | Oe ....................................... 128/154 |
| 5,067,015 | 11/1991 | Cambridge et al. .............. 358/133 |
| 5,070,413 | 12/1991 | Sullivan et al. ................... 358/456 |
| 5,072,384 | 12/1991 | Doi et al. ........................ 364/413.13 |
| 5,218,717 | 6/1993 | Reitberger . |
| 5,221,967 | 6/1993 | Ward et al. ........................ 348/180 |
| 5,243,424 | 9/1993 | Emmett ............................. 358/143 |
| 5,319,715 | 6/1994 | Nagami et al. ..................... 381/74 |

FOREIGN PATENT DOCUMENTS

| | | |
|---|---|---|
| 072984 | 3/1983 | European Pat. Off. . |
| 87888 | 3/1990 | Japan . |
| 124192 | 5/1991 | Japan . |
| 108988 | 5/1991 | Japan . |

OTHER PUBLICATIONS

"Spatial and Temporal Information Measures—Test Scene Evaluation II", NTIA/ITS—A. Webster, Jul. 13,1992, pp. 1–8.

"Preliminary Analysis of Subjective Test Results", NTIA/ITS—A. Webster, Sep. 30, 1991, pp. 1–15.

"Correlation Between Its Objective Measures and Subjective Video Quality: Preliminary Results On A Set Of 15 Scenes", NTIA/ITS—S. Voran, pp. 1–3.

"Progress Report On Subjective And Objective Quality Assessment Of VTC/VT Systems", NTIA/ITS—Stephen Wolf, Jul. 9, 1991, pp. 1–5.

International Telematics Symposium (ITS '91), "Measuring Video Performance", G. Kelley and S. Wolf, Nov. 28, 1991; pp. 11–21.

"Features for Automated Quality Assessment of Digitally Transmitted Video", S. Wolf, Jun. 1990, pp. 1–93.

"The Development And Evaluation Of An Objective Video Quality Assessment System That Emulates Human Viewing Panels", S. Voran and S. Wolf, International Broadcasting Convention, Jul. 1992, pp. 504–508.

"Objective quality Assessment of Digitally Transmittal Video", S. Wolf, M. Pinson, S. Voran and A. Webster, IEEE Pacific Rim Conference, etc., May 9–10, 1991, pp. 477–482.

"The Development And Correlation Of Objective and Subjective Video Quality Measures", S. Voran and S. Wolf, IEEE Pacific Rim Conference, etc., May 9–10, 1991, pp. 483–485.

"The Development Of Objective Video Quality Measures That Emulate Human Perception", S. Voran, IEEE Global Telecommunications Conference, Dec. 2–5, 1991, pp. 1776–1781.

"Motion–Still Segmentation Algorithm For VTC/VT Objective Quality Assessment", NTIA/ITS—S. Voran and S. Wolf, Jan. 22, 1991, pp. 1–15.

"Objective Measures Of Video Impairment: An Update on the ITS Derivation Process", NTIA/ITS—S. Voran, Jan. 22, 1992, pp. 1–8.

"Spatial and Temporal Information Measures for Video Quality", NTIA/ITS, A. Webster & S. Wolf, Jan. 22, 1992, pp. 1–16.

"Objective Measures of Video Impairment: Analysis of 128 Scenes", NTIA/ITS—S. Voran & S. Wolf, Mar. 25, 1992, pp. 1–5.

Milt Leonard, "Chip Set Broadens Options for Image Compression", Electronics Design, Sep. 27, 1990, pp. 173–176.

Ronald K. Jurgen, "Digital Video", IEEE Spectrum, Mar. 1992, pp. 24–30.

"Spatial and Temporal Information Measures –Test Scene Evaluation", NTIA/ITS—A. Webster, Mar. 30, 1992, pp. 1–5.

"An Update On ITS Video Quality Parameters", NTIA/ITS, S. Wolf, Jul. 13, 1992, pp. 1–4.

"The Effect of Multiple Scenes on Objective Video Quality Assessment", NTIA/ITS—S. Voran, Jul. 13, 1992, pp. 1–2.

"An Automated Technique for Measuring Transmitted Frame Rate (TFR) and Average Frame Rate (AFR)", NTIA/ITS, S. Wolf, Jul. 13, 1992, pp. 1–5.

"Preliminary Results of One–Way Video Delay Measurement Algorithms", NTIA/ITS, C. Jones, S. Wolf and M. Pinson, Jul. 13, 1992, pp. 1–18.

"The Development And Evaluation Of An Objective Video Quality Assessment System That Emulates Human Viewing Panels", S. Voran and S. Wolf, Jul. 3–7, 1992, pp. 1–8.

"The Paradox of Consensus, Committee T1 Standards Newsletter", Oct. 1992.

"Time Delay Estimation For Objective Speech Quality Assessment", Kubichek et al., Oct. 6, 1992 –authorship date; Oct. 13, 1992 –presentation date, T1A1Mtg.

"Time Delay Estimation For Objective Speech Quality", Tallak et al., IEEE Catalog No. 93CH3288–8.

"Group Index and Time Delay Measurements Of A Standard Reference Fiber", Danielson et al., NBSIR 88–3091, Jul. 1988.

"Transmission Rating And Customer Opinion Models", Duorek, Standards Contribution to Working Group T1Q1.1, Jul. 25, 1989.

"Delay Definitions for T1Q1.1", Merrill, T1Q1.1/89–066, T1Q1.1 Working Group, Jul. 19, 1989.

"In–Service, Non Intrusive Measurement Device (INMD) Voice Service Measurements", TIMI Mar. 1989.

"Definitions of Delay for Telecommunication", Ingle, T1Q1.1 Working Group, Jul. 26, 1989.

*Primary Examiner*—John K. Peng
*Assistant Examiner*—Chris Grant
*Attorney, Agent, or Firm*—Oliff & Berridge

[57] ABSTRACT

A method for objectively and non-intrusively measuring the audio-visual quality of a destination audio-video signal that generates measurement parameters that are indicative of human image quality perceptions. Subjective human test panel results are generated for a variety of audio-video test samples and objective test results are also generated by the apparatus of the invention for the variety of audio-video test samples. Accordingly, when the apparatus extracts test frames from the actual source and destination audio-video signals and compares them, audio-visual quality parameters are output by the apparatus that are indicative of the audio-visual quality of the destination audio-visual signal based upon the source audio-visual signal.

12 Claims, 7 Drawing Sheets

FIG. 7

PERCEPTION-BASED AUDIO VISUAL SYNCHRONIZATION MEASUREMENT SYSTEM

This is a Division of application Ser. No. 08/153,561 filed Oct. 6, 1993, now abandoned which in turn is a Continuation-in-part of application Ser. No. 08/006,000 filed Jan. 19, 1993 now U.S. Pat. No. 5,446,492.

BACKGROUND OF THE INVENTION

1. Field of the Invention

The video portion of the invention relates generally to an apparatus for measuring the video delay and perceptual degradation in video quality from a video source to a video destination. The video portion of the invention may be used to measure the video quality and video delay of transmission channels. The video may include moving images as well as still images. The transmission channels may include, but are not limited to, digital encoders and decoders, video storage/retrieval systems, analog transmission circuits, and digital transmission circuits. The new portion of the invention relates generally to an apparatus for non-intrusively measuring the audio delay and the perceptual change in audio-visual synchronization from a source of audio-visual information to a destination of audio-visual information via a transmission channel. Audio-visual synchronization is important because a loss of synchronization due to a transmission channel affects the perceived quality of the audio-visual information. Since the invention can non-intrusively measure the audio-visual synchronization without the use of special test signals, the audio-visual signal being transmitted by the transmission channel may include any arbitrary audio and video information. The transmission channels may include, but are not limited to, digital encoders and decoders, audio-video storage/retrieval systems, analog transmission circuits, and digital transmission circuits. The perception-based video quality measurement system of the parent application is used in implementing the present invention.

2. Description of the Prior Art

Devices for measuring the video quality of analog transmission channels have been available for a number of years. These devices utilize standard test patterns (such as a resolution test chart) or test waveforms (such as a color bar) for determining the degradation in video quality. Often, the results of these tests are not easily related to the perceptual may require the transmission channel to be taken out-of-service. Broadcasters have circumvented the out-of-service problem by using portions of the video signal that are not visible to the viewer (such as the vertical interval in the NTSC video standard) for quality testing.

With the advent of modern video coding systems, video signals are now commonly transmitted and stored in compressed digital form, with a potential loss of quality resulting from the compression process itself or from the decreased resilience of the compressed data when transmission errors occur. These digital systems have introduced many new impairments that are not quantified by the traditional methods mentioned above. Examples include unnatural (jerky) motion, image persistence, and image blocking. The basic reason the traditional quality measurement methods do not work for these new digital systems is that the perceptual quality of the destination video changes as a function of the pictorial content of the source video. Perceivable impairments may result when the source video is transmitted using a bandwidth that is less than the inherent spatial and temporal information content of the source video. Thus, one video scene (with low spatial and temporal information content) may be transmitted with small impairments while another video scene (with high spatial and temporal information content) may suffer large impairments. Attempts to measure the video quality using special test signals or test patterns with spatial and temporal information content that differ from the actual source video content results in inaccurate measurements. In, addition, since digital systems quite often either do not transmit the non-visible portions of the video or treat the non-visible portions differently than the visible portions, the transmission channel must be taken out of service to use special test patterns. Here, the visible portion of the video signal is that part of the picture that the viewer sees while the non-visible portion of the video signal is that part of the picture that the viewer does not see.

Designers of modern video coders and decoders have realized the shortfalls of the traditional analog methods mentioned above. Lacking anything better, they have quite often used the mean squared error (or some variant thereof) between the source video and the destination video for optimizing the video quality that their coders and decoders produce. However, the mean squared error does not correlate well with the perceptual quality of the video. In addition, since a perfect copy of the source and destination video is required to compute the mean squared error, this method is generally not practical unless the video source and video destination are geographically co-located.

Designers of video transmission equipment and standards organizations have resorted to using subjective tests when they require accurate measurements of video quality. Subjective tests are normally performed by having a large panel of viewers judge the perceived video quality. However, these subjective tests are very expensive and time consuming to conduct.

If the transmission channel is used for interactive (two-way) communications, then video delay is another important quality attribute of the transmission channel. Excessive delays can impede communications. In general, the video delay is also a function of the source video in modem digital communications systems. Consequently, the video delay of the transmission channel could change depending upon the information content of the source video. Thus, the use of special video delay test signals which are not the same as the actual video observed by the viewer could lead to erroneous results.

Devices for measuring the audio delay and the audio-visual synchronization of transmission channels have been available for a number of years. These devices utilize special audio or audio-visual test signals which require the transmission channel to be taken out-of-service (e.g. an audio-visual test signal such as a clapper or metronome where flashes of light in the video occur at the same time as clicks in the audio). These special audio and audio-visual synchronization test signals have proved quite useful for analog transmission channels.

The recent advent of digital transmission channels that utilize data compression techniques to remove information redundancy in the audio-visual signal has resulted in a new class of transmission channels where both the audio and video delays vary (and hence the audio-visual synchronization can vary) as the input signal is changed. For instance, the video delay of a scene that contains a small amount of motion (such as a head and shoulders scene with only the lips and eyes moving) may be quite different from the video delay of a scene that contains a large amount of motion (such as a football game). As a result, the audio-visual synchronization measured with traditional test signals is not easily related to the perceptual audio-visual synchronization of the video when that video is something other than the test signal itself. This can lead to inaccurate and irrelevant measurement results.

Another drawback with traditional audio and audio-visual synchronization test signals is that the transmission channel normally must be taken out-of-service, as the transmission channel is being used to transmit the test signal and thus cannot be used to transmit other audio-visual information.

SUMMARY OF THE INVENTION

It is accordingly an object of the present invention to provide an improved method and system for measuring the video quality of transmission channels. Another object of the invention is to provide an improved method and system for measuring the audio delay, video delay and the change in audio-visual synchronization resulting from a transmission channel. Here, the transmission channels may include, but are not limited to, digital encoders and decoders, video storage/retrieval systems, analog transmission circuits, and digital transmission circuits.

Another object of the invention is to provide an improved method for measuring the video delay of transmission channels.

Another object of the invention is to provide a method of measuring video quality that agrees closely with the perceptual video quality obtained from a large panel of human viewers.

Another object of the invention is to provide a non-intrusive, in-service method for measuring the video quality and video delay of transmission channels.

Another object of the invention is to provide an improved method for measuring the audio delay of transmission channels.

Another object of the invention is to provide a method of measuring the change in audio-visual synchronization that agrees closely with human perception.

Another object of the invention is to provide a non-intrusive, in-service method for measuring the audio delay, video delay, and audio-visual synchronization of transmission channels.

These and other objects are achieved according to the present invention by measuring the audio delay, the video delay and perceptual degradation in video quality, and the perceptual change in audio-visual synchronization using features that are extracted from the source audio-visual signal and destination audio-visual signal. These features are such that they can be easily and quickly communicated between the source and destination locations. Since the invention uses the actual audio-visual signal being sent by the user of the transmission channel, specialized out-of-service test patterns or waveforms are not required.

BRIEF DESCRIPTION OF THE DRAWINGS

Other objects, advantages, and novel features of the subject invention will become apparent from the following detailed description of the invention when considered with the accompanying drawing figures, wherein.

DETAILED DESCRIPTION OF THE PREFERRED EMBODIMENTS

Figure 1:
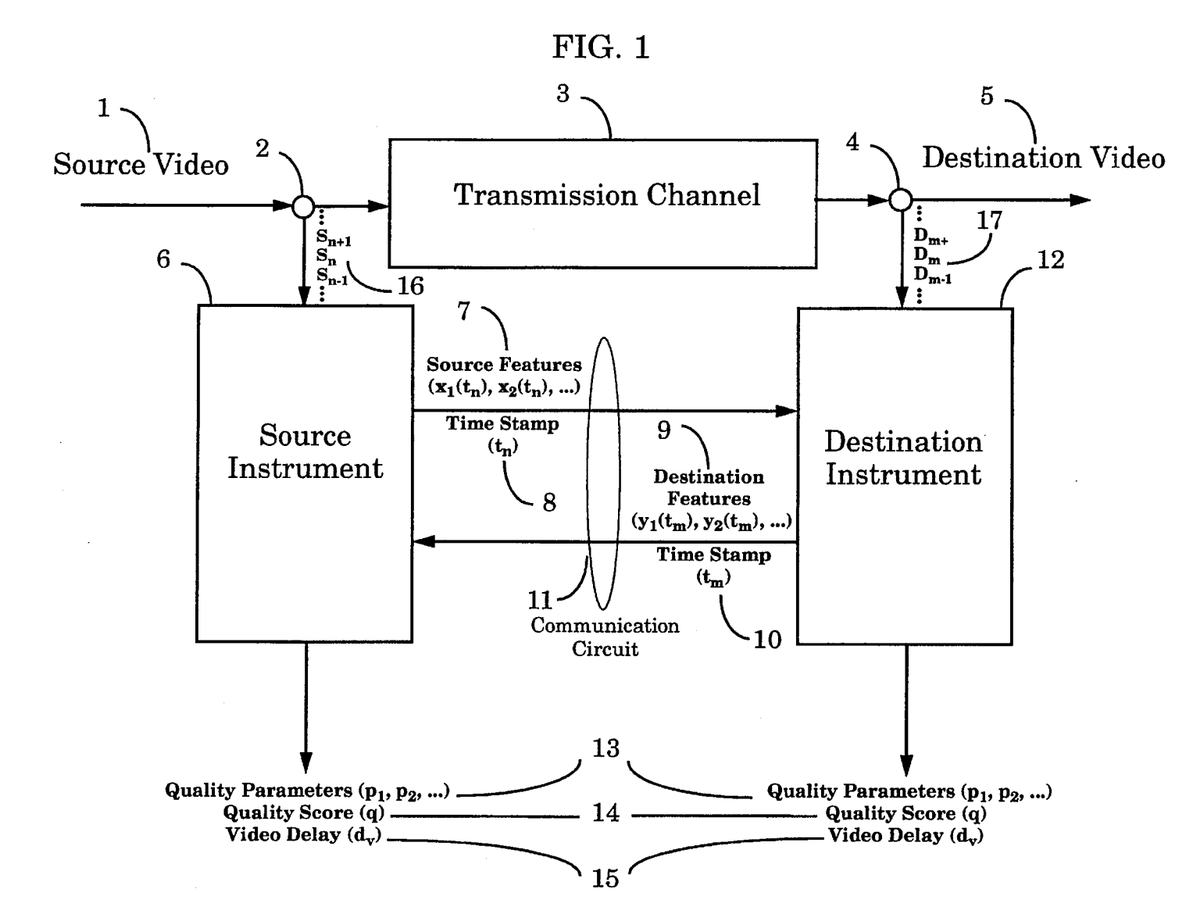
FIG. 1 is an illustration showing how the video portion of the invention is non-intrusively attached to the transmission channel.

FIG. 1 shows a block diagram of how one embodiment of the invention is attached to the transmission channel 3 whose video quality and delay are to be measured. Referring to FIG. 1, the source instrument 6 and the destination instrument 12 are non-intrusively attached to the source video 1 and destination video 5 using couplers 2 and 4, respectively. At each time instant $t_n$, the source instrument extracts a set of source features 7 ($x_1(t_n)$, $x_2(t_n)$, ...) from a plurality of source video frames 16 (..., $S_{n-1}$, $S_n$, $S_{n+1}$, ...) where each source video frame includes a plurality of source pixels. Similarly, at each time instant $t_m$, the destination instrument 12 extracts a set of destination feature 9 ($y_1(t_m)$, $y_2(t_m)$, ...) from a plurality of destination video frames 17 (..., $D_{m-1}$, D, $D_{m+1}$, ...) where each destination video frame includes a plurality of destination video frame includes a plurality of destination pixels. Here, $t_n$ is the time at which source video frame $S_n$ is present at the source video and thus denotes the time stamp when the set of source features 7 ($x_1(t_n)$, $x_2(t_n)$, ...) is extracted. Similarly, $t_m$ is the time at which destination video frame $D_m$ is present at the destination video and thus denotes the time stamp when the set of destination feature 9 ($y_1(t_m)$, $y_2(t_m)$, ...) is extracted. The time indices n and m are integers that are incremented by one for each new video frame. This normally occurs at a fixed rate that depends upon the video standard being used (for NTSC video, n and m will be incremented by one approximately 30 times per second). Preferably in the method, one set of source features 7 and one set of destination features 9 is extracted for each integer value of n and m, respectively.

As shown in FIG. 1, when the source instrument 6 and destination instrument 12 are geographically separated due to the length of the transmission channel, they can communicate their sets of features (7, 9) and time stamps (8, 10) using a communication circuit 11. If the source video 1 is known, the source features 7 and its time stamps 8 can be precomputed and stored in the destination instrument 12 instead by means of a communication circuit 11.

The instruments 6 and 12 respectively use the sets of source features 7 and the corresponding time stamps, and the sets of destination features 9 and the corresponding time stamps 10 to produce a set of quality parameters 13 ($p_1$, $p_2$, ...), a quality score parameter 14 (q) and a video delay parameter 15 ($d_v$). The set of quality parameters 13 ($p_1$, $p_2$, ...), the quality score parameter 14 (q), and the video delay parameter 15 ($d_v$) are updated at a rate that is consistent with human perception.

Figure 2:
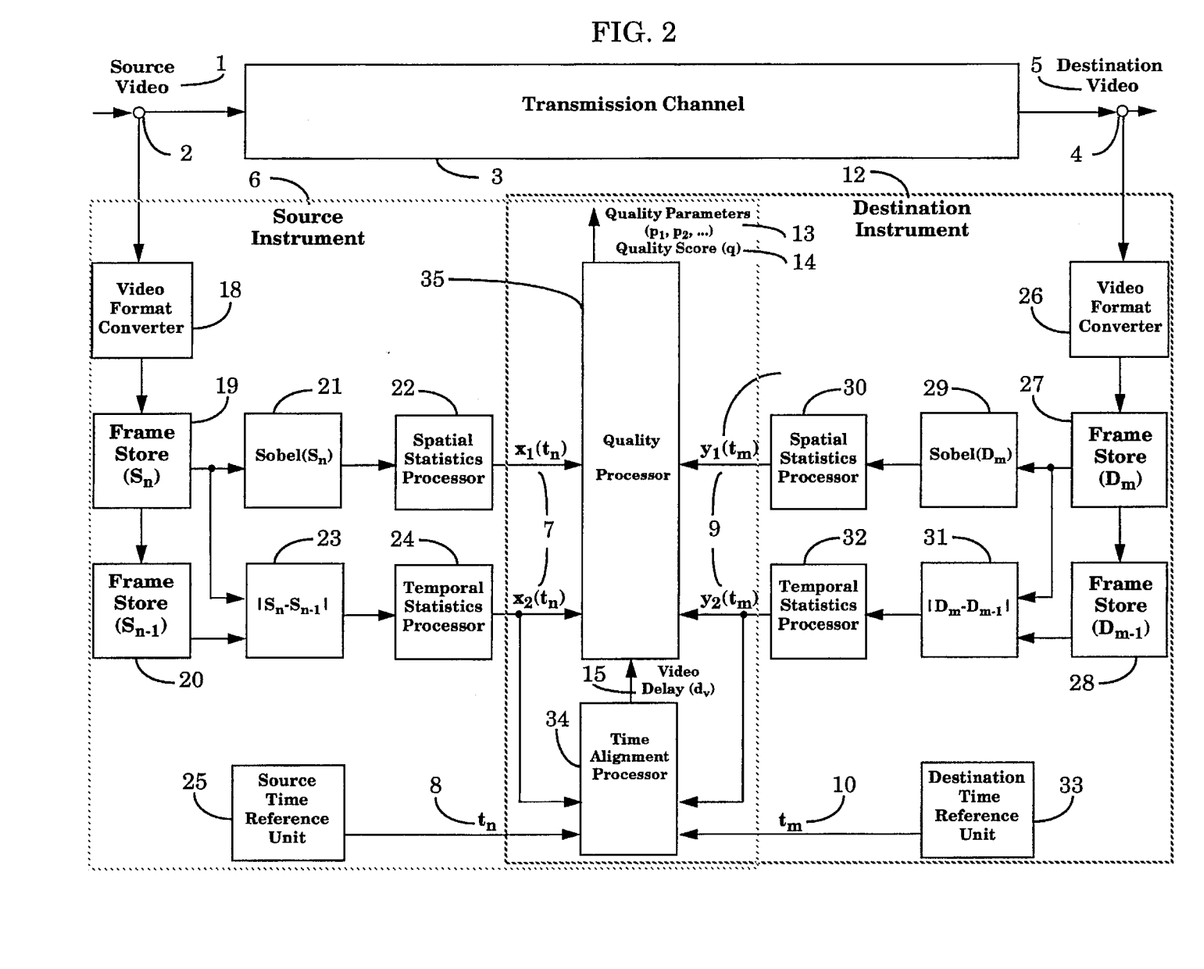
FIG. 2 is a block diagram showing an image processing apparatus according to one embodiment of the invention.

FIG. 2 is a detailed block diagram of a source instrument 6 and destination instrument 12 for measuring the video delay and perceptual degradation in video quality according to one embodiment of the present invention. In FIG. 2, a non-intrusive coupler 2 is attached to the transmission line carrying the source video signal 1. The output of the coupler 2 is fed to a video format converter 18. The purpose of the video format converter 18 is to translate the source video signal 1 into a format that is suitable for a first source frame store 19.

The first source frame store 19 is shown containing a source video frame $S_n$ at time $t_n$, as output by the source time reference unit 25. At time $t_n$, a second source frame store 20 is shown containing a source video from $S_{n-1}$, which is one video frame earlier in time than that stored in the first source frame store 19. A source Sobel filtering operation is performed on source video frame $S_n$ by the source Sobel filter 21 to enhance the edge information in the video image. The enhanced edge information provides an accurate, perception-based measurement of the spatial detail in the source video frame $S_n$. A source absolute frame difference filtering operation is performed on the source video frames $S_n$ and $S_{n-1}$ by a source absolute frame difference filter 23 to enhance the motion information in the video image. The enhanced motion information provides an accurate, perception-based measurement of the temporal detail between the source video frames $S_n$ and $S_{n-1}$.

A source spatial statistics processor 22 and a source temporal statistics processor 24 extract a set of source features 7 from the resultant images as output by the Sobel filter 21 and the absolute frame difference filter 23, respectively. The statistics processors 22 and 24 compute a set of source features 7 that correlate well with human perception and can be transmitted over a low-bandwidth channel. The bandwidth of the source features 7 is much less than the original bandwidth of the source video 1.

Also in FIG. 2, a non-intrusive coupler 4 is attached to the transmission line carrying the destination video signal 5. Preferably, the coupler 4 is electrically equivalent to the source coupler 2. The output of the coupler 4 is fed to a video format converter 26. The purpose of the video format converter 26 is to translate the destination video signal 5 into a format that is suitable for a first destination frame store 27. Preferably, the video format converter 26 is electrically equivalent to the source video format converter 18.

The first destination frame store 27 is shown containing a destination video frame $D_m$ at time $t_m$, as output by the destination time reference unit 33. Preferably, the first destination frame store 27 and the destination time reference unit 33 are electrically equivalent to the first source frame store 19 and the source time reference unit 25, respectively. The destination time reference unit 33 and source time reference unit 25 are time synchronized to within one-half of a video frame period.

At time $t_m$, the second destination frame store 28 is shown containing a destination video frame $D_{m-1}$, which is on video frame earlier in time than that stored in the first destination frame store 27. Preferably, the second destination frame store 28 is electrically equivalent to the second source frame store 20. Preferably, frame stores 19, 20, 27 and 28 are all electrically equivalent.

A destination Sobel filtering operation is performed on the destination video frame $D_m$ by the destination Sobel filter 29 to enhance the edge information in the video image. The enhanced edge information provides an accurate, perception-based measurement of the spatial detail in the source video frame $D_m$. Preferably, the destination Sobel filter 29 is equivalent to the source Sobel filter 21.

A destination absolute frame difference filtering operation is performed on the destination video frames $D_m$ and $D_{m-1}$, by a destination absolute frame difference filter 31 to enhance the motion information. The enhanced motion information provides an accurate, perception-based measurement of the temporal detail between the destination video frames $D_m$ and $D_{m-1}$. Preferably, the destination absolute frame difference filter 31 is equivalent to the source absolute frame difference filter 23.

A destination spatial statistics processor 30 and a destination temporal statistics processor 32 extract a set of destination feature 9 from the resultant images as output by the destination Sobel filter 29 and the destination absolute frame difference filter 31, respectively. The statistics processors 30 and 32 compute a set of destination features 9 that correlate well with human perception and can be transmitted over a low-bandwidth channel. The bandwidth of the destination features 9 is much less than the original bandwidth of the destination video 5. Preferably, the destination statistics processors 30 and 32 are equivalent to the source statistics processors 22 and 24, respectively.

The source features 7 and destination features 9 are used by the quality processor 35 to compute a set of quality parameters 13 ($p_1, p_2, \ldots$), and quality score parameter 14 (q). According to one embodiment of the invention, a detailed description of the process used to design the perception-based video quality measurement system will now be given. This design process determines the internal operation of the statistics processors 22, 24, 30, 32 and the quality processor 35, so that the system of the present invention provides human perception-based quality parameters 13 and quality score parameter 14.

Figure 3:
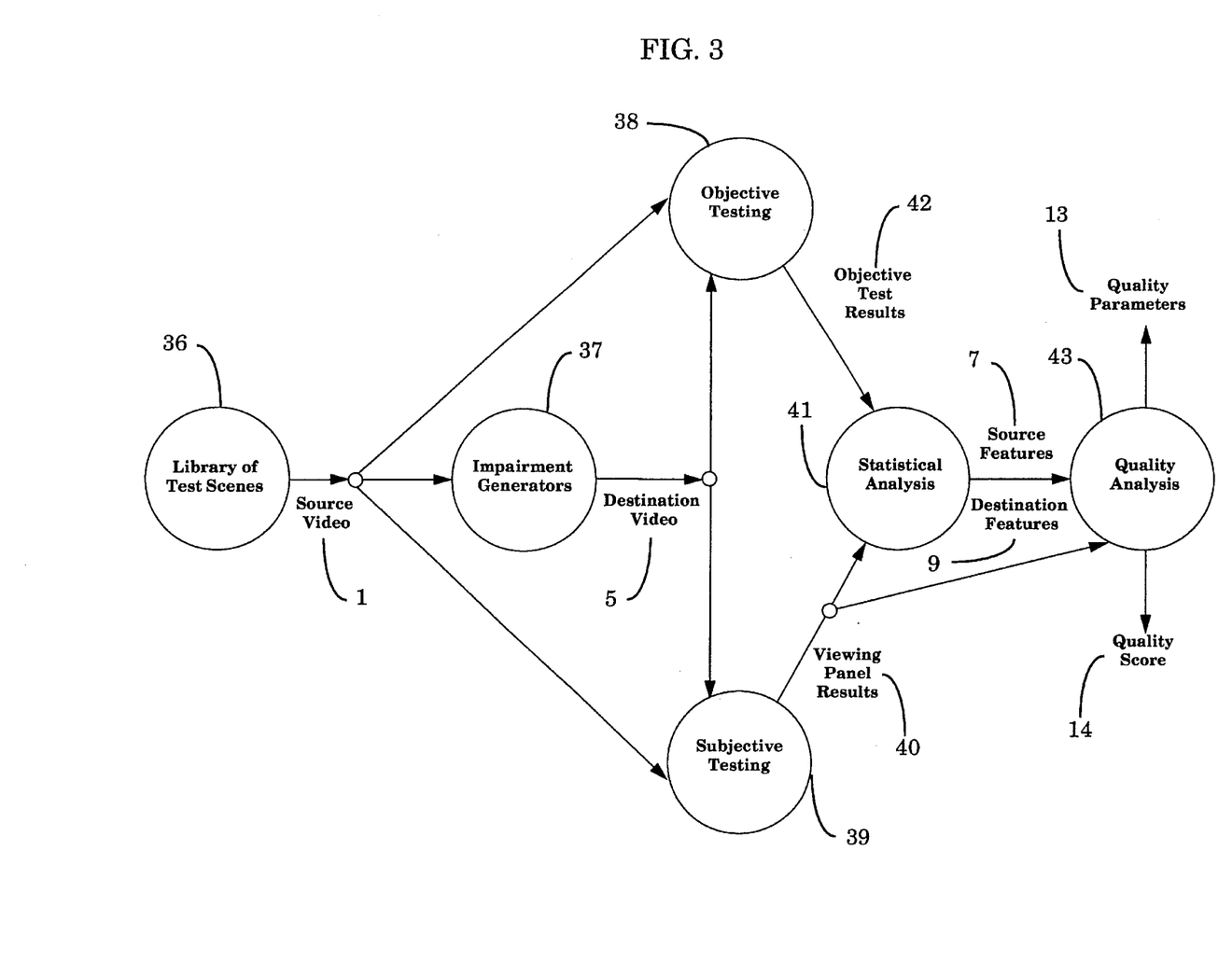
FIG. 3 is an illustration showing the development process used to design the perception-based video quality measurement system.

As shown in FIG. 3, a library of test scenes 36 is preferably chosen to be representative of the types of video scenes that will be transmitted by the transmission channel 3. This library of test scenes is chosen to include video scenes that span the entire range of spatial and temporal information that might be transmitted as a video signal through the transmission channel 3.

The source video 1 from the library of test scenes 36 is input to the impairment generators 37. The impairment generators 37 generate an impaired destination video 5' that includes impairments that span the entire range and types of impairments that can arise from the variety of transmission channels 3 that could be incorporated into the system of the present invention.

Subjective testing 39 is conducted using the source video 1, the impaired destination video 5', and a large panel of viewers to judge the impairment of the impaired destination video 5' with respect to the source video 1. The subjective testing 39 produces the viewing panel results 40.

Objective testing is also performed on the source video 1 and the impaired destination video 5' by an objective testing means 38, using components 18, 19, 20, 21, 23 of the source instrument 6 and components 26, 27, 28, 29, 31 of the destination instrument 12, respectively. The source video signals for the subjective and objective testing are selected from a library of test scenes. The test scenes are representative of the type of images which could be transmitted, depending on the type of transmission channel. The objective testing means 38 produces the objective test results 42, which are candidate measures of perceptual video quality.

Joint statistical analysis is then performed on the objective test results 42 and the viewing panel results 40 by a statistical analysis means 41 to produce a set of source features 7 and a set of destination feature 9. The only source feature 7 and the destination feature 9 which are produced from the objective test results 42 are those that correlate well with the viewing panel results 40. Preferably, in the method of the present invention, the output of the statistical analysis means 41 determines the internal functioning of the statistics processors 22, 24, 30 and 32.

The quality analysis means 43 uses the source feature 7, the destination features 9, and the viewing panel results 40 to produce the quality parameters 13 and the quality score parameter 14. The quality analysis means 43 determines the optimal combination of the source features 7 and the destination features 9 so that the quality parameters 13 and the quality score parameter 14 are produced which correlate well with the viewing panel results 40. Preferably, in the method of the present invention, the output of the quality analysis means 43 determines the internal functioning of the quality processor 35.

An overview of the time alignment processor 34 will now be given. The transmission video delay through the transmission channel 3 is non-zero. Video delays due to the coding process used by the transmission channel or due to the actual propagation of the video signal will cause this transmission video delay to be non-zero. In addition, the transmission video delay can vary dynamically, either because of changing transmission coding delays for various source video signals 1, or because of dynamic reconstructions of the transmission channel 3. Therefore, the time alignment processor 34 is dynamic, and can measure these variations in the video delay. For one embodiment of the invention, the time alignment processor 34 measures the video delay parameter 15 ($v_d$), using the source time stamps 8 ($t_n$), the destination time stamps 10 ($t_m$), the source features 7 ($x_2(t_n)$) as output by the temporal statistics processor 24, and the destination features 9 ($y_2(t_m)$) as output by the source temporal processor 32. The source features 7 ($x_2(t_n)$) as output by the source temporal statistics processor 24, and the destination features 9 ($y_2(t_m)$) as output by the destination temporal processor 32 are ideally suited for use in determining the video delay parameter 15 ($v_d$) since these features respond to the flow of motion in the source video signal 1 and the destination video signal 5, respectively. The video delay parameter 15 ($v_d$), as output from the time alignment processor 34 is an important measure of video quality when the transmission channel 3 is used for interactive two-way video transmission. Preferably, this video delay parameter 15 ($v_d$) is also input to the quality processor 35, so that the quality processor may time align the source features 7 and the destination features 9, before combining them and producing the quality parameters 13 and the quality score parameter 14.

In one embodiment of the present invention, the source and destination spatial statistics processors 22 and 30 compute the standard deviation of the pixels contained within the Region of Interest (ROI) for which the video quality is to be measured. The ROI may be the entire image, but preferably it is a small subset of the pixels forming the entire image. The subset is selected based on the processing power of the system and the bandwidth of the transmission channel. For example, in a low bandwidth channel, the ROI is preferably the subset of the image having a maximal amount of motion, while in a high bandwidth channel, the ROI is the subset having a minimal amount of motion. Preferably, for each iteration, a different subset of the image is selected, so that one area of the image is not used exclusively. Further, if enough processing power is available, both the high motion and low motion subsets are preferably used for each iteration. The standard deviation of the Region of Interest, represented by $std_{ROI}$, is computed as:

$$std_{ROI} = \left[ \left( \frac{1}{n} \sum_{i=1}^{n} r_i^2 \right) - \left( \frac{1}{n} \sum_{i=1}^{n} r_i \right)^2 \right]^{1/2}$$

where:

$r_i$ is a pixel of the Region of Interest, the ROI comprising n pixels.

Thus the following equations for $x_1(t_n)$ and $y_1(t_m)$ are:

$$x_1(t_n) = std_{ROI}\{Sobel(S_n)\}$$

$$y_1(t_m) = std_{ROI}\{Sobel(D_m)\}$$

Also, in one embodiment of the present invention, the source destination temporal statistics processors 24 and 32 compute the root mean squared value of the pixels contained within the ROI for which the video quality and delay is to be measured. This statistical function, represented by $rms_{ROI}$, is computed as:

$$rms_{ROI} = \left[ \frac{1}{n} \sum_{i=1}^{n} r_i^2 \right]^{1/2}$$

where:

$r_i$, is a pixel of the ROI, the ROI comprising n pixels.

Thus, the following equations for $x_2(t_n)$ and $y_2(t_m)$ are:

$$x_2(t_n) = rms_{ROI}\{|S_n - S_{n-1}|\}$$

$$y_2(t_m) = rms_{ROI}\{|D_m - D_{m-1}|\}$$

A detailed description of the time alignment processor 34 for one embodiment of the present invention will now be given. Motion that is present in the source-video signal 1 will be detected by the time history of the source features ($x_2(t_n)$) as output by the source temporal statistics processor 24, with larger values of ($x_2(t_n)$) representing larger amounts of motion. Likewise, motion that is present in the destination video signal 5 will be detected by the time history of the destination features ($y_2(t_m)$) as output by the destination temporal statistics processor 32, with larger values of ($y_2(t_m)$) representing larger amounts of motion. After some time delay ($d_v$), the source video signal 1 has passed through the transmission channel 3, thereby becoming the destination video signal 5, which is a possibly impaired version of the source video signal 1.

By comparing the time history of the source features ($x_2(t_n)$) with the time history of the destination features ($y_2(t_m)$), one can measure how much time was required by the transmission channel to transmit the video signal. First, the two time histories of $x_2(t_n)$ and $y_2(t_m)$ are time shifted with respect to each other and aligned such that the standard deviation of their difference waveform is a minimum. To measure the video delay parameter 15 ($d_v$) at time n=N for the source video, first form the source time history vector $$x_2(t_N) = [x_2(t_{N-K}), \ldots, x_2(t_{N-1}), x_2(t_N)]$$

Which contains $x_2(t_N)$ and the previous K time samples. Similarly, from a set of destination time history vectors for the destination video defined by $$y_2(t_m) = [y_2(t_{m-K}), \ldots, y_2(t_{m-1}), y_2(t_m)]$$

for every m such that $t_m \geq t_N$.
Only time delays greater than or equal to zero need to be considered. Then, the correlation function is computed as $$c_m = std[\underline{x}_2(t_N) - \underline{y}_2(t_m)]$$

where the standard deviation (std) is computed using the K+1 components of the difference vector. The m=M that gives the minimum value of $c_m$ is the correct alignment and the video delay parameter 15 ($d_v$) can be computed using this value of m=M according to the equation $$d_v = t_M - t_N$$

In one embodiment of the present invention, the video delay can by dynamically updated to track changes in the transmission channel. An overall average and/or histogram of the measured video delays can then be obtained.

Figure 4:
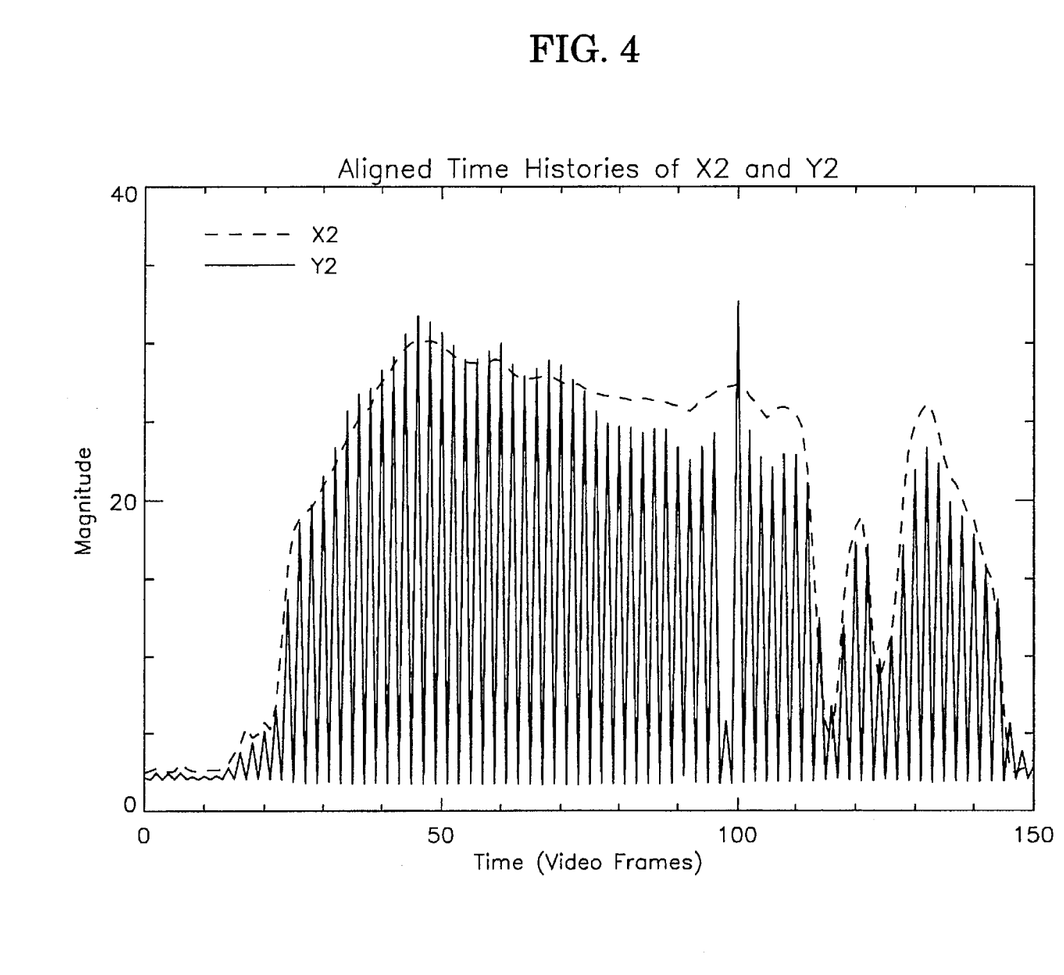
FIG. 4 demonstrates the operation of the time alignment processor in computing the transmission channel video delay.

FIG. 4 demonstrates aligned time histories of $\underline{x}_2(t_N)$ and $\underline{y}_2(t_M)$ for K=150 video frames (approximately 5 seconds of video for the NTSC video standard). As shown in FIG. 4, the motion in the source video was smooth and contained a camera pan. The corresponding motion in the destination video was distorted and contained areas of no motion (when the transmission channel simply repeated the same video frame over and over and thus no motion was registered) and areas of large jerky motion that appeared as spikes (when the transmission channel performed a video frame update after not doing so for one or more video frames). In FIG. 4, the number of unique video frames that were passed by the transmission channel were considerably less than what was present in the source video. By counting the number of frames that contain motion in $\underline{y}_2(t_M)$, and comparing this number with the total possible (K+1), a useful and novel measure of the Average Frame Rate (AFR) for the transmission channel can be computed as $$AFR = [\#fps] \, [\#motion \, frames \, in \, \underline{y}_2(t_M)]/[K+1]$$

where #fps is the number of frames per second of the video signal being measured (fps is approximately 30 for the NTSC video standard). For the data shown in FIG. 4, the AFR was computed to be approximately 15 frames per second (AFR=[30][75]/[151]). By reducing the length of time used for the AFR calculation (reducing K), AFR can by used to measure the transmitted frame rate of the transmission channel at any instant in time. Advantageously, AFR can track dynamic changes in the transmission channel.

Preferably, the time alignment processor 34 only computes the video delay ($d_v$) when motion is present in the source video. When there is no motion in the source video, the video delay need not be measured. The standard deviation of the $\underline{x}_2(t_N)$ time series is used to determine the amount of motion in the source video, and hence serves as a useful method for determining the threshold below which there is no motion. Thus, time alignment is computed when $$std[\underline{x}_2(t_N)] > T$$

where T is the threshold below which there is no motion in the source video (e.g., a source video scene that does not contain any motion is used to compute the threshold T).

Preferably, the time alignment processor 34 only uses the samples of $\underline{y}_2(t_m)$ that contain motion for the computation of the correlation function $c_m$. This yields greater accuracy for the measurement of the video delay ($d_v$) when the transmission channel distorts the flow of motion by repeating video frames (as shown in FIG. 4).

A detailed description of the quality processor 35 for one in FIG. 4).

A detailed description of the quality processor 35 for one embodiment of the present invention will now be given. As shown in FIG. 2, the quality processor accepts the source features 7 ($x_1(t_n)$, $x_2(t_n)$, . . . ), the destination features 9 ($y_1(t_m)$, $y_2(t_m)$, . . . ), the video delay 15 ($d_v$) and produces the quality parameters 13 ($p_1$, $p_2$, . . . ), and the quality score parameter 14 (q). The process illustrated in FIG. 3 and described above is used to assure that the quality parameters 13 and the quality score parameter 14 accurately measure the human perception of the video quality.

In one embodiment of this invention, three quality parameters are computed by the quality processor 35. The first quality parameter ($p_1$) is computed for the destination video at time $t_m$ and is given by $$p_1(t_M) = \left| \frac{rms[\underline{x}_1(t_N)] - rms[\underline{y}_1(t_M)]}{rms[\underline{x}_1(t_N)]} \right|$$

where $$\underline{x}_1(t_N) = [x_1(t_{N-K}), \ldots, x_1(t_{N-1}), x_1(t_N)]$$

and $$\underline{y}_1(t_M) = [y_1(t_{M-K}), \ldots, y_1(t_{M-1}), y_1(t_M)]$$

Here, the root mean squared (rms) value is computed using the K+1 components of the vectors $\underline{x}_1(t_N)$ or $\underline{y}_1(t_M)$, and $t_N = t_M - d_v$, where the video delay parameter 15 ($d_v$) is obtained from the time $$p_2(t_M) = std[fil\{max_{pp}[\underline{x}_2(t_N) - [\underline{y}_2(t_M)]\}]$$

where $\underline{x}_2(t_N)$ and $\underline{y}_2(t_M)$ have previously been defined, $max_{pp}$ performs a component of component maximum function with the zero vector ($\underline{0}$) and results in a vector of length K+1, fil performs a three point peak enhancing convolutional filtering operation with the convolutional kernel [−1, 2, −1] and results in a vector lenght K−1 (the two endpoints are discarded), and std computes the standard deviation using the K−1 components of the vector that results from the fil function. As before, $t_N = t_M - d_v$, where the video delay parameter 15 $d_v$ is obtained from the time alignment processor 34. The third quality parameter ($p_3$) is computed for the destination video at time $t_M$ and is given by $$p_3(t_M) = max \left[ log \left[ \frac{\underline{x}_2(t_N)}{\underline{y}_2(t_M)} \right] \right]$$

where $\underline{x}_2(t_N)$ and $\underline{y}_2(t_M)$ have previously been defined, and the division of $\underline{x}_2(t_N)$ by $\underline{y}_2(t_M)$ is a component by component division that results in a vector of length K+1, log is a component by component base 10 logarithmic operation that results in a vector of length K+1, and max computes the maximum of the K+1 components of the vector that results from the log function. As before, $t_N = t_M - d_v$, where the video delay 15 $d_v$ is obtained from the time alignment processor 34.

In one embodiment of this invention, the three quality parameters are linearly combined by the quality processor 35 to produce a quality score parameter 14 (q). This quality score parameter 14 (q) is computed for the destination video at time $t_N$ and is given by $$q(t_M) = c_0 - c_1 p_1(t_M) - c_2 p_2(t_N) - c_3 p_3(t_N)$$

where the combining coefficients are determined according to the process shown in FIG. 3 as previously described. The coefficients $c_0$, $c_1$, $c_2$ and $c_3$ are predetermined depending on the particular transmission channel being used. For example, in a test system designed by the inventors, the coefficients which gave objective quality parameter q(t) values close to the subjective quality measurements are $c_0$=4.81, $c_1$=5.43, $c_2$=0.035 and $c_3$=1.57.

In one embodiment of the present invention, the quality parameters $p_1$, $p_2$, $p_3$ and the quality score parameter q can by dynamically computed to track changes in the transmission channel 3. An overall average and/or histogram of the measured values can than be obtained.

Figure 5:
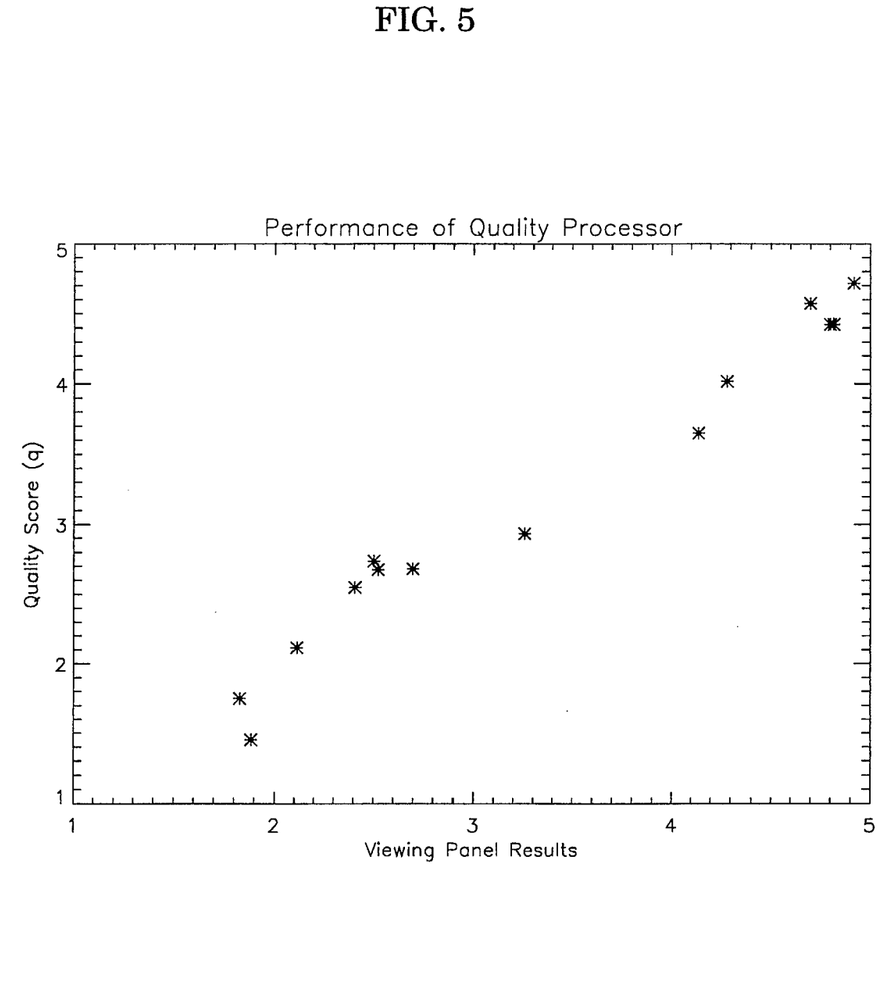
FIG. 5 provides a demonstration of the performance of the quality processor.

FIG. 5 provides a demonstration of the performance of the quality processor for the embodiment described above. In FIG. 5, the viewing panel results from FIG. 3 are plotted against the quality score parameters 14 (q) as output by the quality processor 35. The results in FIG. 5 used fourteen different transmission channels and five source video scenes per transmission channel. A root mean squared error of 0.27 quality units (on a scale from 1 to 5) was obtained.

The present invention is not limited to the above embodiment, which operates on the luminance portion of the video signal. For example:

1. A similar embodiment of this invention as shown in FIGS. 1 and 2 designed as described in FIG. 3 can be used for the color portions of the video signal.

2. Pseudo-sobel filters may be used for the filters 21 and 29.

3. Frame differences using non-consecutive frames (e.g., |S−S|) where K=2, 3, 4, . . . may be used for the filters 23 and 31.

4. Field differences using consecutive or non-consecutive fields, or any combination thereof, may be used for the filters 23 and 31 when the video signal being measured is interlaced (i.e., where one frame is composed of multiple fields).

5. The filters 21 and 29 may be applied to fields rather than frames when the video signal being measured is interlace (i.e., where one frame is composed of multiple fields).

6. The spatial statistics processors 22 and 30 may extract statistics other than the standard deviation (std). For example, the root mean squared value or the mean, or higher ordered statistics, may be used.

7. The temporal statistics processors 24 and 32 may extract statistics other than root mean square (rms). For example, the standard deviation or the mean, or higher ordered statistics, may be used.

8. The time alignment processor 34 may use features other than just $x_2(t_n)$ and $y_2(t_m)$ to compute the video delay $d_v$. For example, the time alignment processor may use $x_1(t_n)$ and $y_1(t_m)$ in addition to $x_2(t_n)$ and $y_2(t_m)$.

9. Time alignment algorithms or correlation functions ($c_m$) other than the one described in the above embodiment may be used for computation of the correct time alignment and video delay $d_v$. For example, if the standard cross correlation function is used, the m=M that maximizes the standard cross correlation function would then determine the correct time alignment.

10. The exact number and equational forms of the quality parameter 13, as computed by the quality processor 35, may vary as determined by the process in FIG. 3. For example, the following presents an alternate form for quality parameter $p_1(t_M)$:

$$p_1(t_M) = rms \left| \frac{x_1(t_N) - y_1(t_M)}{x_1(t_N)} \right|$$

where the subtraction and division is performed component by components and produces a vector of length K+1, and the root mean squared (rms) value is computed using the K+1 components of this resulting vector. The quality parameter $p_1$ is sensitive to non-unity transmission channel gain. However, $p_1$ can be made insensitive to non-unity transmission channel gain by replacing $y_1(t_m)$ with $y_1(t_m)/g$ where g is the video transmission channel gain.

11. The exact combining method used by the quality processor 35 for combining the quality parameters 13 and producing the quality score 14 may vary as determined by the process FIG. 3. For example, a non-linear combing method may be substituted for the linear combining method described in the above embodiment.

Figure 6:
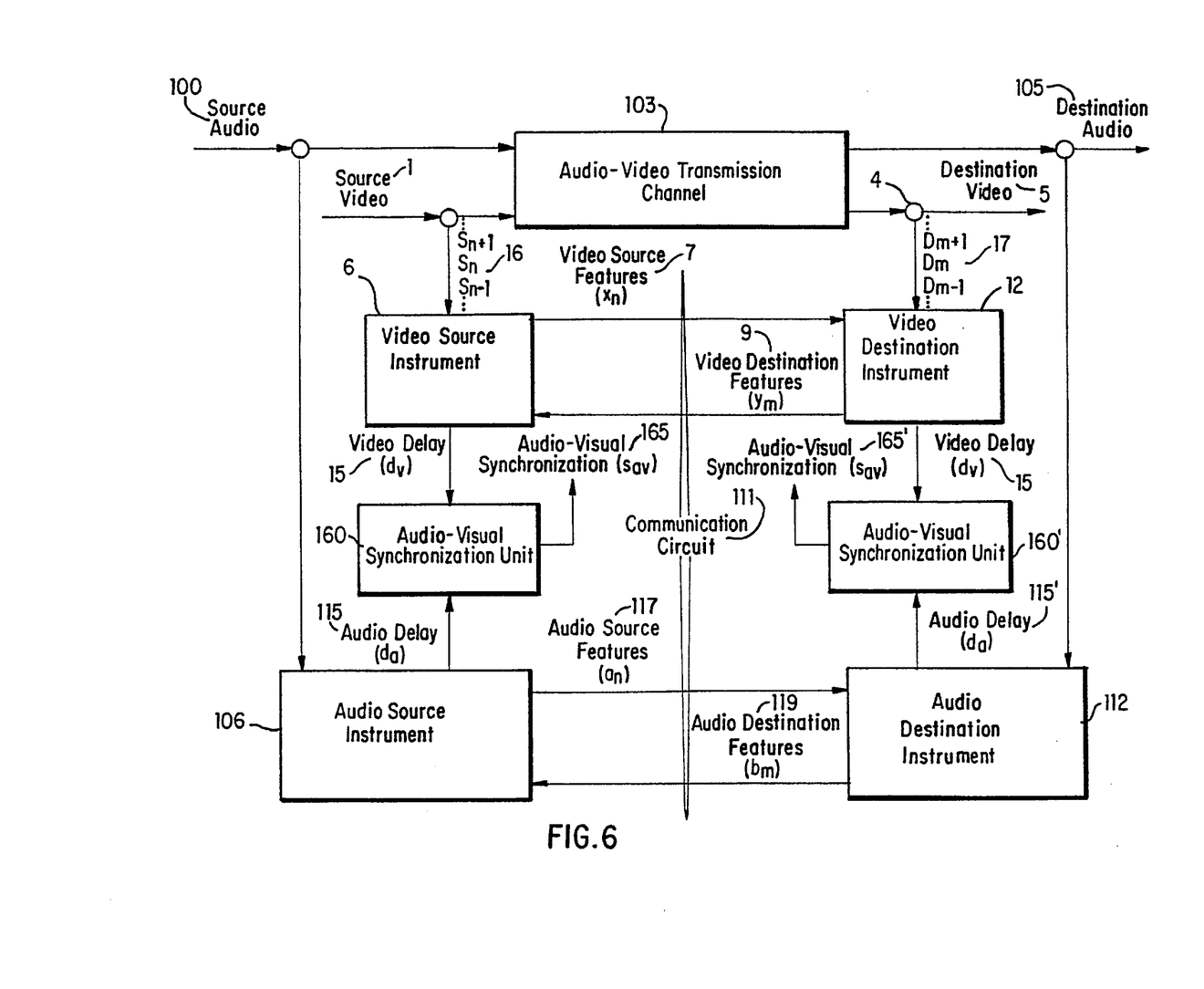
FIG. 6 is an illustration showing how the audio-visual synchronization measurement system is non-intrusively attached to the transmission channel.

FIG. 6 is a block diagram of how one embodiment of the audio-visual invention is attached to the transmission channel whose audio delay, video delay, and audio-visual delay synchronization are to be measured. Referring to FIG. 6, the video source instrument 6 and the video destination instrument 12 are non-intrusively attached to the source video 1 and destination video 5 using video couplers. For each source video frame $S_n$ at time instant n, the video source instrument 6 extracts a source video feature 7 $x_n$ from a plurality of source video frames ( . . . , $S_{n-1}$, $S_n$, $S_{n+1}$. . . ), where each source video frame includes a plurality of source pixels. Similarly, the video destination instrument 12 extracts a destination video feature 9 $y_m$ from each destination video frame $D_m$ at time m from a plurality of destination video frames ( . . . $D_{m-1}$, $D_m$, $D_{m+1}$ . . . ), where each destination video frame includes a plurality of destination pixels. The time indices n and m are integers that are incremented by one for each new video frame or field. This normally occurs at a fixed rate that depends upon the video standard being used. Preferably in the method, a source video feature 7 and a destination video feature 9 is extracted for each integer value of n and m respectively.

Also shown in FIG. 6, an audio source instrument 106 extracts a source audio feature 117 an from the source audio where $a_n$ is extracted at the same time as $x_n$, the video source feature. Similarly, the audio destination instrument 112 extracts a destination audio feature 119 $b_m$ from the destination audio, where $b_m$ is extracted at the same time as $y_m$, the video destination feature. This is done for each n and m.

As shown in FIG. 6, when the source instruments and the destination instruments are geographically separated due to the length of the transmission channel, they can communicate their sets of features using a communication circuit. If the source audio and video are known apriori, the video source features and the audio source features can be pre-computed and stored in the video and audio destination instruments instead of being communicated to the video and audio destination instruments by means of a communication circuit.

The video source instrument and video destination instrument use the time histories of the video source feature ( . . . , $x_{n-1}$, $x_n$, $x_{n+1}$, . . . ) and the video destination feature ( . . . $y_{m-1}$, $y_m$, $y_{m+1}$ . . . ) to compute the video delay 15 $d_v$ of the transmission channel. Like wise, the audio source instrument and audio destination instrument use the time histories of the audio source features ( . . . $a_{n-1}$, $a_n$, $a_{n+1}$, . . . ) and the audio destination features ( . . . $b_{m-1}$, $b_m$, $b_{m+1}$. . . ) to compute the audio delay $d_a$. An audio-visual synchronization unit 160 then uses the video delay $d_v$ and the audio delay $d_a$ to compute the audio-visual synchronization 165 $s_{av}$. Advantageously, the audio-visual synchronization $s_{av}$ that is measured is consistent with human perception.

Figure 7:
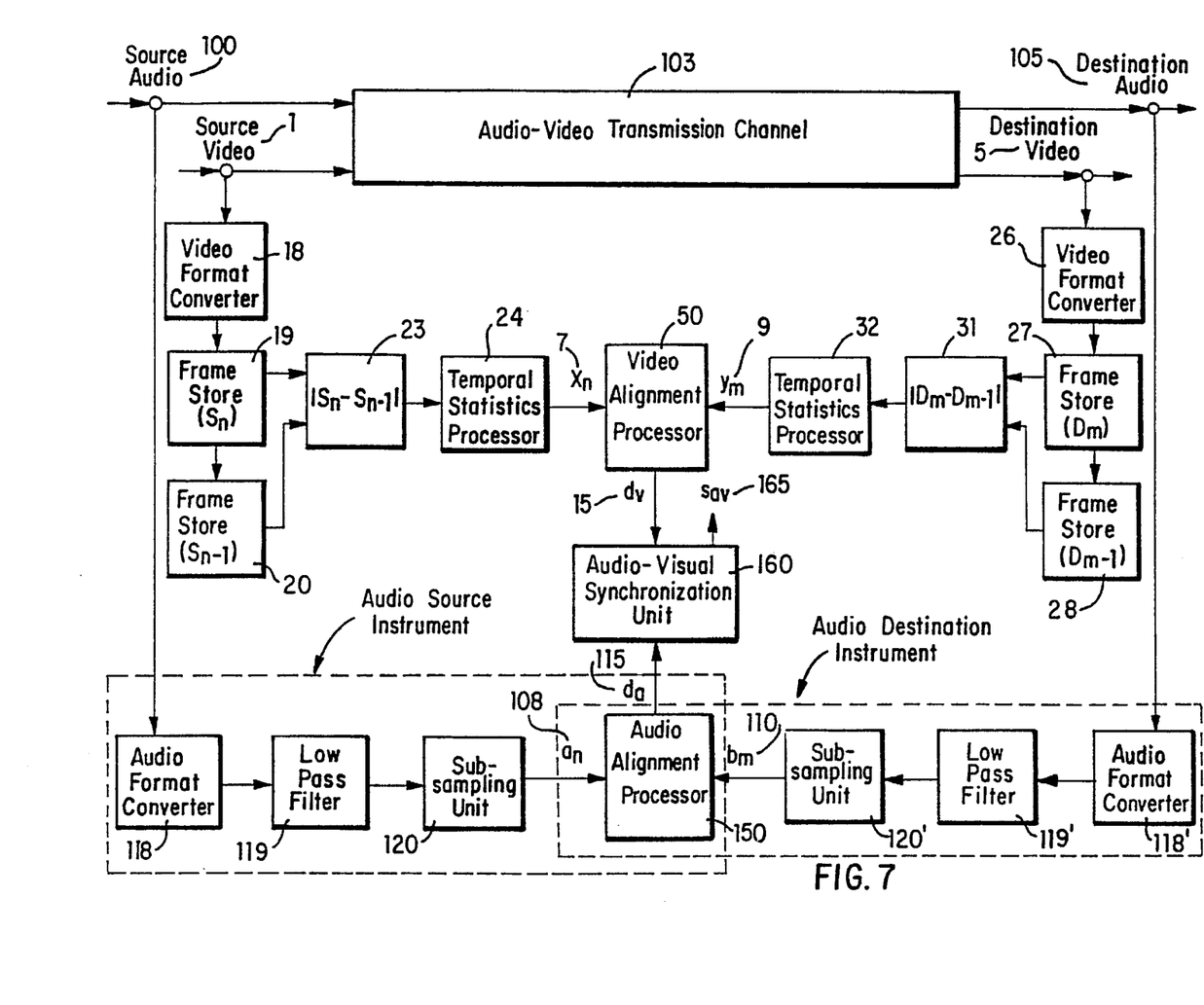
FIG. 7 is a block diagram showing an image and signal processing apparatus according to one embodiment of the invention.

FIG. 7 is a detailed block diagram of the system for measuring the audio delay, the video delay, and the perceptual change in audio-visual synchronization according to one embodiment of the present invention. In FIG. 7, non-intrusive couplers are attached to the source video and the destination video. The output of the video couplers are fed to video format converters, whose purpose is to translate the video signal into a format that is suitable for the frame stores. In FIG. 7, the source frame stores are shown containing two source video frames $S_n$ and $S_{n-1}$, from time n and n−1, respectively. Likewise, the destination frame stores are shown containing two destination video frames $D_m$ and $D_{m-1}$, from time m and m−1, respectively.

Preferably, an absolute frame difference filtering operation is performed on source video frames 19 $S_n$ and 20 $S_{n-1}$, the purpose of which is to enhance motion information in the video image sequence. Advantageously, this enhanced motion information provides an accurate, perception-based measurement of the video delay of the transmission channel. A temporal statistics processor 24 extracts a source feature $x_n$ from the resultant image as output by the absolute frame difference filtering operation. An identical absolute frame difference filtering operation is also performed on destination video frames $D_m$ and $D_{m-1}$. Likewise a temporal statistics processor 32 then extracts a destination feature $y_m$ from the resultant image as output by the absolute frame difference filtering operation. Advantageously, the temporal statistics processors compute video source features and video destination features that correlate well with human perception of video delay and that are low-bandwidth, much less so than the original bandwidth of the source video.

The video alignment processor 50 shown in FIG. 7 uses the time histories of the video source features ( . . . , $x_{n-1}$, $x_n$, $x_{n+1}$, . . . ) and the video destination features ( . . . $y_{m-1}$, $y_m$, $y_{m+1}$ . . . ) to compute the video delay $d_v$ of the transmission channel. Preferably, the video alignment processor 50 shown in FIG. 7 uses the same method for time aligning the video source features and the video destination features as the time alignment processor 34 shown in FIG. 2.

Also in FIG. 7, non-intrusive couplers are attached to the source audio 100 and destination audio 105. The output of the audio couplers are fed to audio format converters whose purpose is to translate the audio signals into a format that is suitable for the low pass filters (119, 119') shown in FIG. 7. Advantageously, the low pass filters remove unwanted high frequency information that would produce erroneous audio alignment results if not removed. The low pass filtered source and destination audio, as output by the low pass filters, provide an accurate perception-based measurement of the audio delay of the transmission channel. Sub-sampling units (120, 120') subsample the outputs of the low pass filters such that there are at least twice as many samples per second as the frequency bandwidth of the low pass filter. The source audio sub-sampling unit produces an audio source feature $a_n$ at the same time as the source temporal statistics processor produces the corresponding video source feature $x_n$. Likewise, the destination audio sub-sampling unit produces an audio destination feature $b_m$ at the same time as the destination temporal statistics processor produces the corresponding video destination feature $y_m$. Advantageously, the sub-sampling units compute audio source features and audio destination features that correlate well with human perception of audio delay and that are low-bandwidth, much less so than the original bandwidth of the source audio.

The audio alignment processor 150 shown in FIG. 7 uses the time histories of the audio source features ( . . . $a_{n-1}$, $a_n$, $a_{n+1}$, . . . ) and the audio destination features ( . . . $b_{m-1}$, $b_m$, $b_{m+1}$ . . . ) to compute the audio delay $d_a$ of the transmission channel. Preferably, the audio alignment processor 150 shown in FIG. 7 uses the same method for time aligning the audio source features and the audio destination features as the time alignment processor 34 shown in FIG. 2.

The audio-visual synchronization unit 160 in FIG. 7 uses the video delay 15 $d_v$ as output by the video alignment processor 50 and the audio delay 115 $d_a$ as output by the audio alignment processor 150 and produces the audio-visual synchronization 165 $s_{av}$. Advantageously, the audio-visual synchronization $s_{av}$ provides a measure of the perceptual change in audio-visual synchronization from a source of audio-visual information to a destination of audio-visual information via a transmission channel.

A more elaborate discussion on the timing requirements for proper measurement of quality parameters 13 in FIG. 2, the quality score 14 in FIG. 2, the video delay 15 in FIG. 2 (same as video delay 15 in FIG. 7), the audio delay 115 in FIG. 7, and the audio-visual synchronization 165 in FIG. 7 will now be given. The time stamps 8 and 10 in FIG. 2 are not required to measure the video quality parameters 13 and the video quality score 14 in FIG. 2. This is because arbitrary time stamps could be assigned to source features 7 and destination features 9 and the time alignment processor 34 in FIG. 2 would still give the required video delay 15 to the quality processor 35 to properly align the source features 7 and the destination features 9 (except that this video delay would not be the video delay of the transmission channel 3). Further, if one desires to measure the audio delay 115 and/or the video delay 15, then the transmission of time stamps 8 and 10 are over communication circuit 11 is unnecessary if one of the following conditions is true: (1) the delay of the communication circuit 11 is insignificant compared to the desired accuracy of the audio delay measurement and/or the video delay measurement, or (2) the delay of the communication circuit 11 in FIG. 1 is known. If the delay of the communication circuit 11 in FIG. 1 is not significant (condition 1), than all features (7, 9, 108, 110) can be assumed to have been measured at the same time and hence can be assigned the same time stamps. In this case, the audio alignment processor 150 would compute the correct audio delay 115 and the video alignment processor 50 would compute the correct video delay 15. If the delay of the communication circuit 11 is significant but known (condition 2), then the transmitted features (features that are transmitted over the communication circuit 11) can be assigned time stamps that are one communication circuit 11 delay earlier than the features that were not transmitted. Here also, the audio alignment processor 150 would compute the correct audio delay 115 and the video alignment processor 50 would compute the correct video delay 15. In conditions (1) and (2) above, if both the audio delay and the video delay are measured, then the audio-visual synchronization processor 160 would compute the correct audio-visual synchronization 165. Finally, if one only desires to measure the audio-visual synchronization (and not the audio delay or video delay), then only the relative timing between the audio and video features needs to be preserved. The timing between the source features (7, 108) and the destination features (9, 110) does not have to be preserved.

Various modifications and alterations may be made to the embodiments of the present invention described and illustrated, with the scope of the present invention as defined in the following claims.

We claim:

1. A quality measurement system for measuring an audio-visual quality of a destination audio-visual signal, comprising:

source audio feature extraction means for extracting source audio features from a source audio-visual signal corresponding to the destination audio-visual signal;

source video feature extraction means for extracting source video features from a source audio-visual signal corresponding to the destination audio-visual signal;

destination audio feature extraction means for extracting destination audio features from the destination audio-visual signal;

destination video feature extraction means for extracting destination video features from the destination audio-visual signal;

source time referencing means for providing a source time reference for each one of the source audio features and for each one of the source video features;

destination time referencing means for providing a destination time reference for each one of the destination audio features and for each one of the destination video features;

communication circuit means for communicating the source audio features, the source video features, the source time references, the destination audio features, the destination video features, and the destination time references;

audio quality parameter generation means for generating audio quality parameters, indicative of the audio quality of the destination audio-visual signal based on the source audio-visual signal, from at least one source and at least one destination audio feature;

video quality parameter generation means for generating video quality parameters, indicative of the video quality of the destination audio-visual signal based on the source audio-visual signal, from at least one source and at least one destination video feature; and audio-visual quality parameter generation means for generating audio-visual quality parameters, indicative of the audio-visual quality of the destination audio-visual signal based on the source audio-visual signal, from at least one audio quality parameter and at least one video quality parameter.

2. The quality measurement system of claim 1, wherein the audio-visual quality parameters are indicative of human audio-visual quality perception.

3. The quality measurement system of claim 1, wherein said audio quality parameter generation means generates an audio delay parameter based on at least the extracted source and destination audio features.

4. The quality measurement system of claim 3, wherein said audio quality parameter generation means generates the audio delay parameter further based on a communication circuit delay.

5. The quality measurement system of claim 3, wherein said audio quality parameter generation means generates the audio delay parameter further based on source and destination time references.

6. The quality measurement system of claim 1, wherein said audio-visual quality parameter generation means generates an audio-visual synchronization parameter based on at least the generated audio-visual quality parameters.

7. The quality measurement system of claim 1, wherein the audio-visual quality parameters include an audio-visual synchronization parameter indicative of the difference between time delays of the audio and video components of the destination audio-visual signal.

8. An audio-visual quality measurement system for measuring a change quality between a source audio-visual signal and a corresponding destination audio-visual signal, the audio-visual quality measurement system comprising:

first audio feature extraction means for extracting a first plurality of audio features from the source audio-visual signal based on at least one objective audio measurement criteria;

second audio feature extraction means for extracting a second plurality of audio features from the destination audio-visual signal based on the at least one objective audio measurement criteria;

audio alignment means coupled to the first and the second audio feature extraction means for performing time alignment between corresponding audio features of the first and the second plurality of audio features;

audio quality parameter generation means for combining time aligned corresponding features of the first and the second plurality of audio features to generate at least one audio quality indication;

first video feature extraction means for extracting a first plurality of video features from the source audio-visual signal based on at least one objective video measurement criteria;

second video feature extraction means for extracting a second plurality of video features from the destination audio-visual signal based on the at least one objective video measurement criteria;

video alignment means coupled to the first and the second video feature extraction means for performing time alignment between corresponding video features of the first and the second plurality of video features;

video quality parameter generation means for combining time aligned corresponding features of the first and the second plurality of video features to generate at least one video quality indication; and audio-visual combining means for combining the time aligned corresponding audio and video quality parameters of the first and the second plurality of audio and video features according to a plurality of learned parameters, the plurality of learned parameters having been determined from a joint statistical analysis of a plurality of subjective viewer judgments.

9. The system of claim 8, wherein the first audio feature extraction means and the second audio feature extraction means each comprise:

low pass filtering means for generating a plurality of low pass filtered audio samples, each low pass filtered audio sample corresponding to a respective audio sample of the plurality of low pass filtered audio samples; and sub-sampling means for determining a plurality of sub-sampled audio features, each sub-sampled audio feature corresponding to a respective one of the plurality of low pass filtered audio samples.

10. The system of claim 8, wherein the first video feature extraction means and the second video feature extraction means each comprise:

absolute frame difference filtering means for generating a plurality of difference filtered video frames corresponding to a respective video frame of the plurality of video frames and including a respective plurality of difference filtered pixels; and temporal statistics generating means for determining a plurality of temporal statistic features, each temporal statistic feature corresponding to a statistic of the difference filtered pixels of a respective one of the plurality of difference filtered pixels.

11. A quality measurement system for measuring an audio-visual quality of a destination audio-visual signal, comprising:

source audio feature extraction means for extracting source audio features from a source electromagnetic audio-visual signal corresponding to the destination electromagnetic audio-visual signal;

destination audio feature extraction means for extracting destination audio features from the destination electromagnetic audio-visual signal;

source time referencing means for providing a source time reference for each one of the source audio features;

destination time referencing means for providing a destination time reference for each one of the destination audio features;

communication circuit means for communicating the source audio features, the source time references, the destination audio features, and the destination time references; and audio quality parameter generation means for generating audio quality parameters, indicative of the audio quality of the destination electromagnetic audio-visual signal based on the source electromagnetic audio-visual signal, from at least one source and at least one destination audio feature.

12. The system of claim 11, further comprising:

source electromagnetic video feature extraction means for extracting source video features from a source electromagnetic audio-visual signal corresponding to the destination electromagnetic audio-visual signal;

destination video feature extraction means for extracting destination video features from the destination audio-visual signal, wherein said source time referencing means provides a source time reference for each one of the source video features, said destination time referencing means provides a destination time reference for each one of the destination video features, and said communication circuit means communicates source video features, source time references, destination video features, and destination time references;

video quality parameter generation means for generating video quality parameters, indicative of the video quality of the destination audio-visual signal based on the source audio-visual signal, from at least one source and at least one destination video feature;

audio-visual quality parameter generation means for generating audio-visual quality parameters, indicative of the audio-visual quality of the destination audio-visual signal based on the source audio-visual signal, from at least one audio quality parameter and at least one video quality parameter.

* * * * *